United States Patent
Mayer

(10) Patent No.: US 9,637,163 B2
(45) Date of Patent: May 2, 2017

(54) METHOD FOR OPERATING A STEERING SYSTEM, A STEERING SYSTEM AND A VEHICLE

(71) Applicant: Audi AG, Ingolstadt (DE)

(72) Inventor: Stefan Mayer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/638,777

(22) Filed: Mar. 4, 2015

(65) Prior Publication Data
US 2015/0251688 A1 Sep. 10, 2015

(30) Foreign Application Priority Data

Mar. 8, 2014 (DE) .................. 10 2014 003 302

(51) Int. Cl.
*B62D 5/00* (2006.01)
*B62D 15/00* (2006.01)
*G05G 5/05* (2006.01)

(52) U.S. Cl.
CPC ............. *B62D 5/006* (2013.01); *B62D 15/00* (2013.01); *G05G 5/05* (2013.01)

(58) Field of Classification Search
CPC ........... B62D 5/00; B62D 6/008; B62D 15/00
USPC ....................................................... 180/402
See application file for complete search history.

(56) References Cited

U.S. PATENT DOCUMENTS

| 5,893,429 A | 4/1999 | Hackl et al. |
| 8,666,601 B1 * | 3/2014 | Van Wiemeersch ...... B62D 15/0285 318/264 |
| 2012/0242819 A1 * | 9/2012 | Schamp ................. G08B 21/06 348/78 |
| 2013/0166154 A1 * | 6/2013 | Kohara ................. B62D 1/181 701/49 |

FOREIGN PATENT DOCUMENTS

| DE | 196 01 827 | 7/1997 |
| DE | 100 34 291 | 2/2001 |
| DE | 101 51 010 | 4/2003 |
| DE | 102012005674 | 4/2013 |
| JP | 2000 280926 A | 10/2000 |
| JP | 2006 321434 A | 11/2006 |
| JP | 2012-040977 | 3/2012 |

OTHER PUBLICATIONS

European Search Report issued in counterpart European patent application EP 15 00 0439 on Apr. 5, 2016.
English translation of European Search Report issued in counterpart European patent application EP 15 00 0439 on Apr. 5, 2016.

* cited by examiner

*Primary Examiner* — Joseph Rocca
*Assistant Examiner* — Felicia L Brittman
(74) *Attorney, Agent, or Firm* — Henry M. Feiereisen LLC

(57) ABSTRACT

A steering system of a vehicle includes a steering wheel, a steerable wheel mechanically decoupled from the steering wheel, a steering actuator for setting a rotational position of the steering wheel, a wheel steering drive for steering of the (Continued)

steerable wheel, and a controller for controlling the wheel steering drive and the steering wheel actuator. When the ignition is switched off, the steering wheel is moved with the steering wheel actuator automatically into a neutral position that is independent of a wheel angle of the steerable wheel.

7 Claims, 5 Drawing Sheets

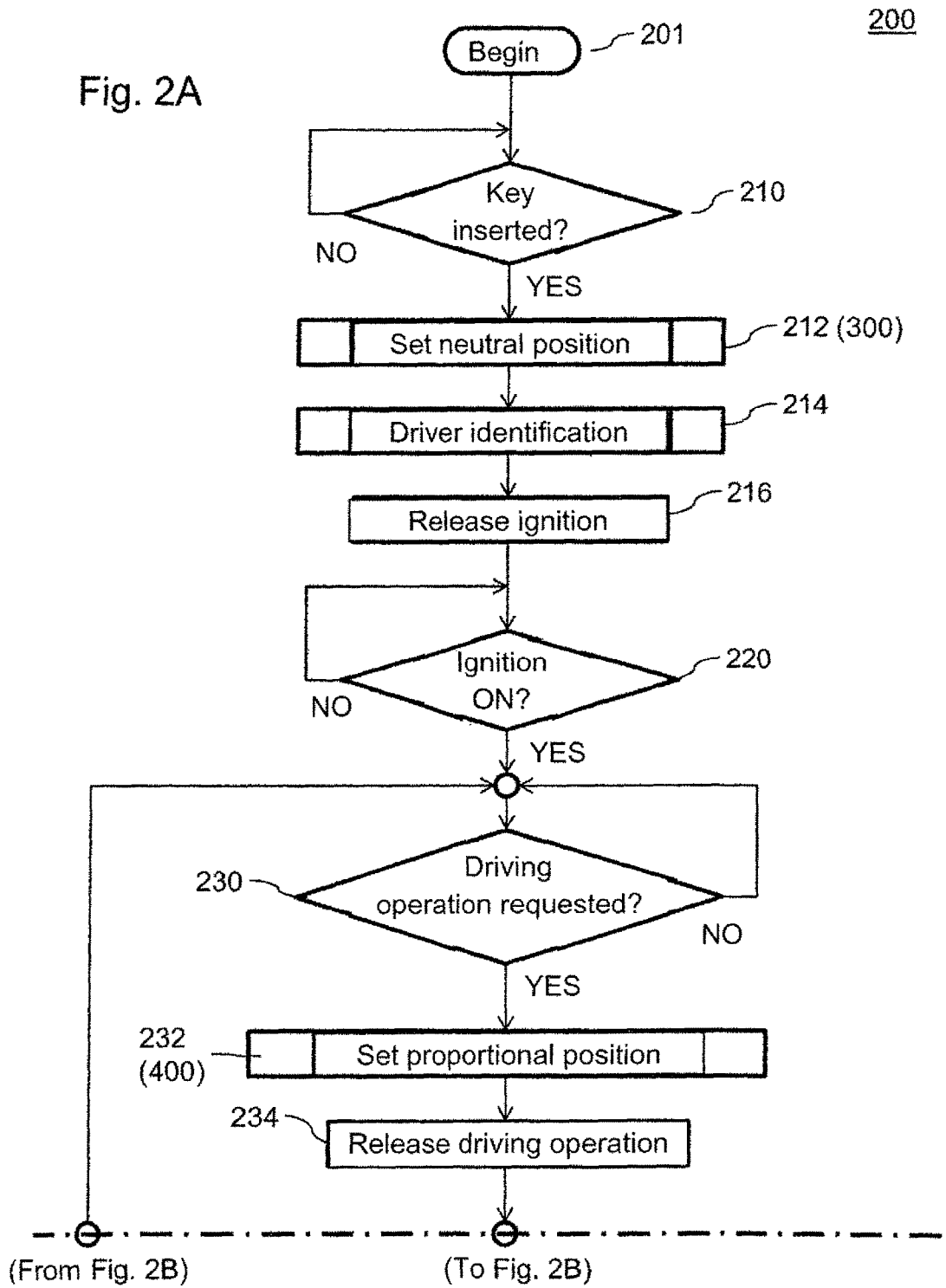

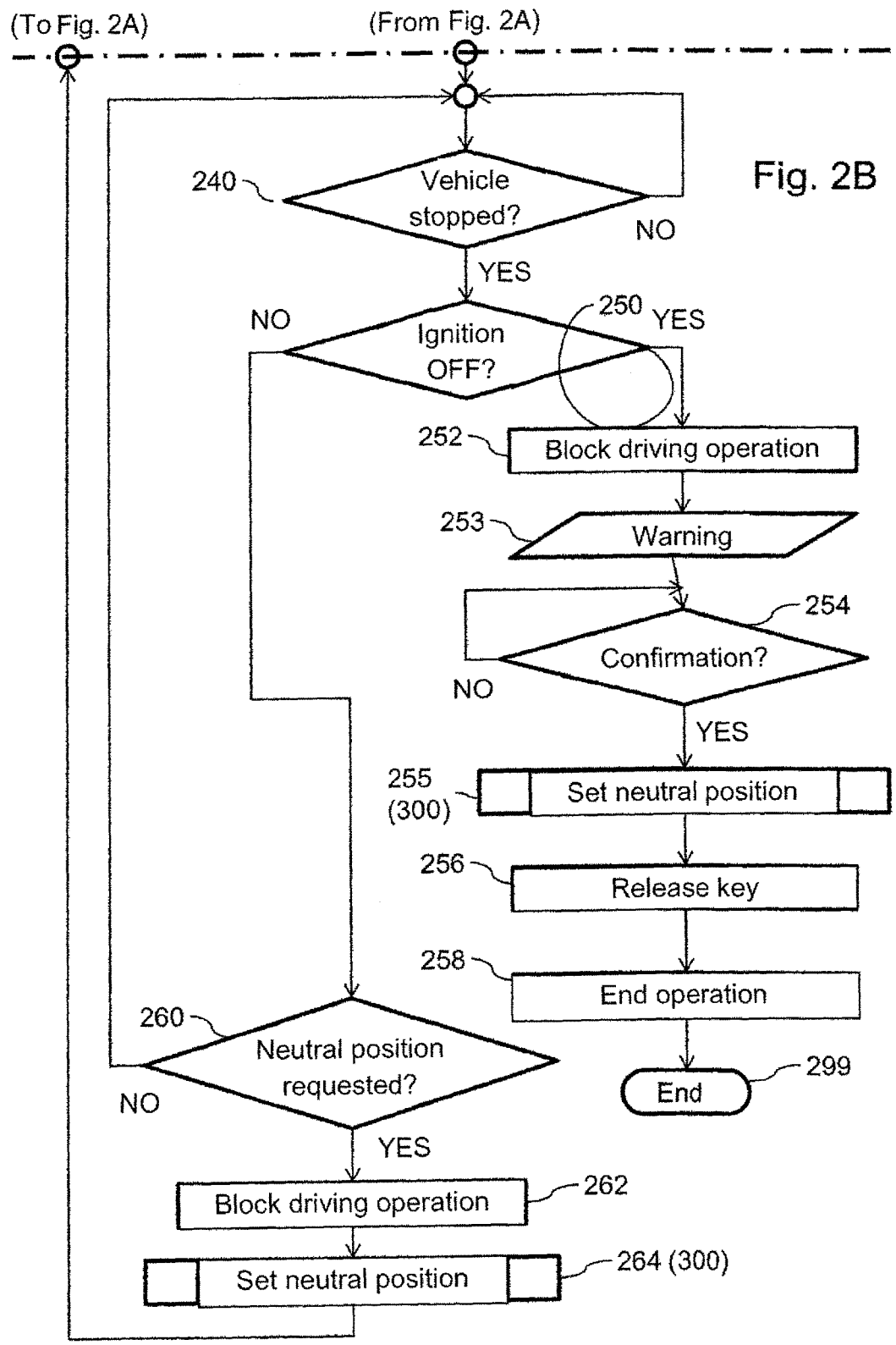

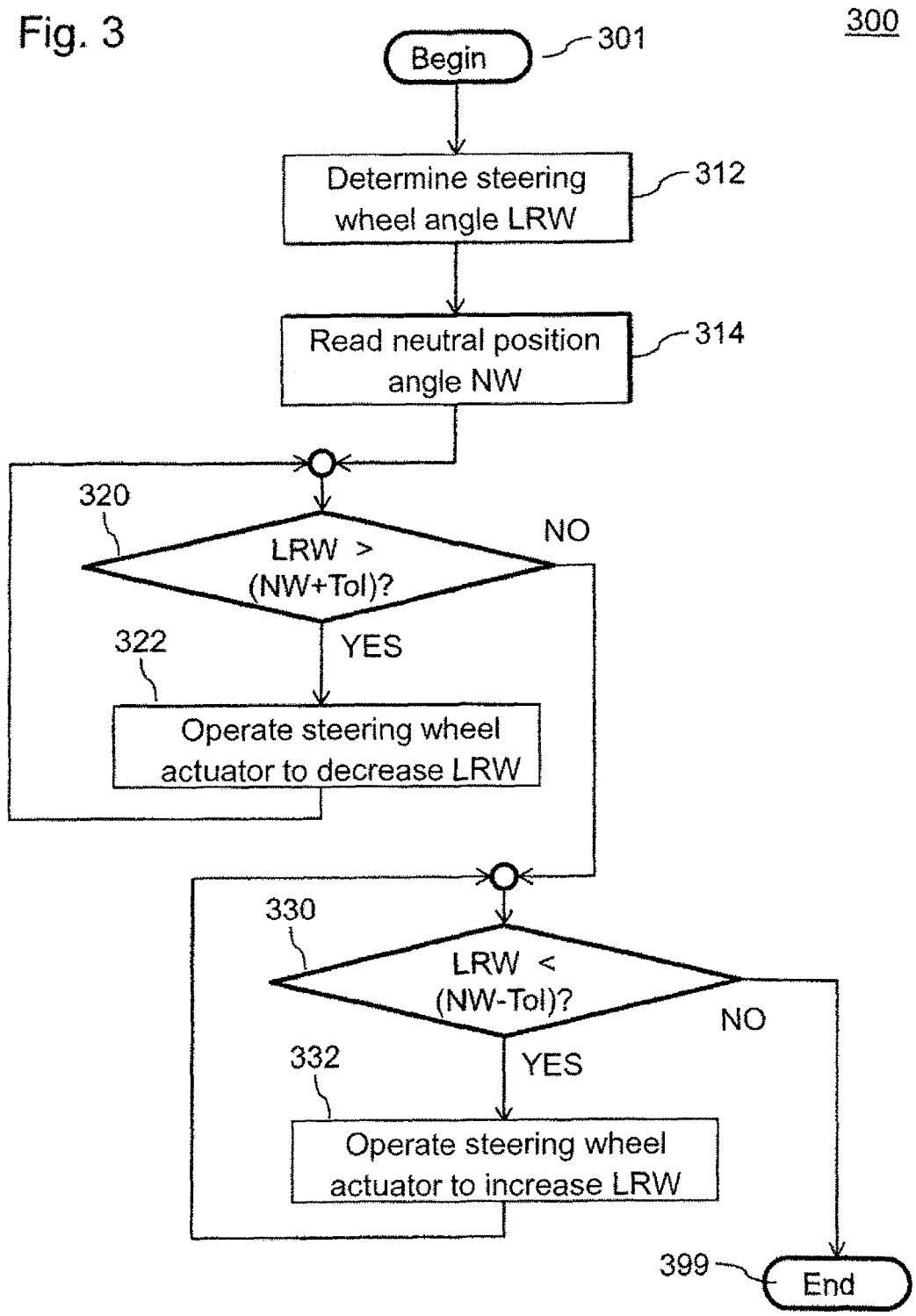

METHOD FOR OPERATING A STEERING SYSTEM, A STEERING SYSTEM AND A VEHICLE

CROSS-REFERENCES TO RELATED APPLICATIONS

This application claims the priority of German Patent Application, Serial No. 10 2014 003 302.3, filed Mar. 8, 2014, pursuant to 35 U.S.C. 119(a)-(d), the content of which is incorporated herein by reference in its entirety as if fully set forth herein.

BACKGROUND OF THE INVENTION

The present invention relates to a method for operating a steering system of a vehicle, a steering system and a vehicle.

The following discussion of related art is provided to assist the reader in understanding the advantages of the invention, and is not to be construed as an admission that this related art is prior art to this invention.

It is known to mechanically decouple in a steering assembly or a steering system of a motor vehicle the steering wheel from the steerable wheels and the steering gear or the like. Such systems are known, for example, by the name "steer-by-wire". In this case, a turn of the steering wheel is detected by a sensor, the output signal from the sensor is processed by a controller and converted into a control command or a control signal for controlling an electromechanical actuator and sent to the actuator to adjust a wheel angle. Conversely, reaction torques of the chassis also detected by sensors, converted by the controller into command signals which are then sent to an electromechanical actuator so as to provide to the driver a realistic reaction torque on the steering wheel. The ratio of the rotational position of the steering wheel and angle of the wheels can be adjusted by the controller to the driving situations, so that interferences due to uneven road surfaces, side winds etc. can be eliminated from the reaction torques.

In spite of the mechanical decoupling, the angle of the steering wheel is still related to the angle of the wheels, and vice versa. This is necessary to ensure a natural feedback of the wheel position and the wheel angle to the driver by way of the steering wheel when the vehicle is moving. In particular, when the vehicle is stopped, the view on the instrument cluster may be restricted depending on the position of the wheels. When the steering wheel is turned, some displays or lights of the instrument cluster may be covered. The driver will then be able to get a good reading of, for example, a status display screen, the total or daily mileage, indicator lamps or the tank fill level, only by turning his upper body or by manually adjusting the steering angle, which requires a large force or may even be prevented by a steering lock when the "Ignition is off" due to the absence of servo assistance. When a camera is installed in the area of the instrument cluster, e.g. for monitoring the driver, the view from the camera to the driver may be obstructed by a steering wheel. This may limit the functionality of the driver monitoring system. In particular, video-based driver detection may become inoperative due to obstructions. Furthermore, in some sports steering wheels, the bottom edge is flattened to facilitate entry and exit. However, if the flattened edge is not at the bottom during entry and exit, it cannot provide relief.

It would therefore be desirable and advantageous to obviate the aforedescribed disadvantages of the prior art at least in some aspects by preventing a line of sight between the instrument cluster and a driver from being obstructed by areas of the steering wheel when the ignition is switched off or when the vehicle is stopped. It would also be desirable and advantageous to improve the comfort during entry and exit of the vehicle when the ignition is switched off or when the vehicle is stopped.

SUMMARY OF THE INVENTION

According to one aspect of the present invention, in a method for operating a steering system of a vehicle, the steering system includes a steering wheel, a steerable wheel, wherein the steerable wheel and the steering wheel are mechanically decoupled, a steering wheel actuator for adjusting a rotational position of the steering wheel, a wheel steering drive for controlling the steerable wheel, and a controller for controlling the wheel steering drives and the steering wheel actuator. According to the method, when the ignition off, the steering wheel is automatically placed by the steering wheel actuator into a neutral position that is independent one of a steering angle of the steerable wheel. The term decoupling of the steerable wheel and the steering wheel is to be understood as allowing the steerable wheel and the steering wheel to be adjustable independently of each other, as described above. When the ignition is off, a position of the steering wheel can be set with the control according to the invention that obviates the aforedescribed disadvantages, Preferably, the neutral position is a position that allows the driver an unobstructed view onto predetermined areas of an instrument cluster of the vehicle. In other words, a line of sight between the driver and these predetermined areas that would be obstructed by the steering wheel in other positions of the steering wheel, is not obstructed in the neutral position. When the predetermined area includes a camera for monitoring the driver, a driver identification system employed by the camera is able to recognize the driver when the vehicle is started, i.e., the vehicle can be operational independent of the wheel angle. When the predetermined area includes a multifunction display screen, indicator lamps, a status display, a mileage indicator, fuel gauge or the like, the driver can recognize information that may be relevant already when entering or when parking the vehicle twisting the upper body or without having to manually correct the steering wheel when the ignition is off. Entering and exiting the vehicle can also be facilitated when the neutral position is a position where a flattened section of the steering wheel points downward.

According to an advantageous feature of the present invention, the steering wheel may be placed into the neutral position immediately after turning off the ignition, upon confirmation by a driver or in response to feedback from a camera aimed at the driver. In the first-mentioned alternative, a degree of automation may be increased and the driver can be relieved of interventions and decisions. In the second-mentioned alternative, the driver may once more be made aware that the steering wheel is placed in the neutral position, and he can be given the opportunity to take his hands off the steering wheel. In the third-mentioned alternative, for example a camera may notify/trigger that the view from the camera, which is preferably positioned in the vehicle so as to be aimed on the driver through the steering wheel or past the steering wheel, on the driver is obstructed, in particular by the steering wheel.

According to another advantageous feature of the present invention, the steering wheel may be placed automatically by the steering wheel actuator in a position corresponding to a steering angle of the steerable wheel when the ignition is switched on. The vehicle is thereby brought into an operational state where a natural steering sensation is ensured. Like when moving into the neutral position, the steering wheel may be adjusted immediately after the ignition is switched on, or in response to a confirmation by a driver. In the latter case, the driver may also be given the opportunity to take enough time to read important data from the instrument cluster. Furthermore, it is also conceivable to automatically place the steering wheel, in response to feedback from a camera aimed at the driver, in a position corresponding to a wheel angle of the steerable wheel.

According to another advantageous feature of the present invention, the steering wheel may, in response to the driver, be placed by the steering wheel actuator in the neutral position or in a position commensurate with a wheel angle of the steerable wheel regardless of a state of ignition. This can exploit the aforedescribed advantages of the invention even when the driver wants to exit or enter the vehicle while the engine is running.

According to another advantageous feature of the present invention, the vehicle is prevented from driving away when the steering wheel is in the neutral position and when the neutral position does not match a wheel angle of the steerable wheel. This also ensures that the vehicle can only be set in motion when an accurate feedback on the wheel angle is reliably provided to the driver.

Advantageously, placing the steering wheel in the neutral position should be permitted only when the vehicle is stopped. This can also prevent a dangerous situation when the ignition malfunctions while driving.

According to another aspect of the invention, a steering system of a vehicle includes a steering wheel, a steerable wheel, wherein the steerable wheel and the steering wheel are mechanically decoupled, a steering wheel actuator for setting a rotational position of the steering wheel, a wheel steering drive for steering of the steerable wheel, and a controller for controlling the wheel steering drive and the steering wheel actuator.

According to the invention, the controller is configured to operate the steering system with a method according to the above description.

According to another aspect of the invention, a vehicle includes a steering system with a steering wheel, a steerable wheel, wherein the steerable wheel and the steering wheel are mechanically decoupled, a steering wheel actuator for setting a rotational position of the steering wheel, a wheel steering drive for steering of the steerable wheel, and a controller for controlling the wheel steering drives and the steering wheel actuator. According to the invention, the steering system is designed according to the above description.

BRIEF DESCRIPTION OF THE DRAWING

Other features and advantages of the present invention will be more readily apparent upon reading the following description of currently preferred exemplified embodiments of the invention with reference to the accompanying drawing, in which:

FIGS. 2A and 2B show a flowchart of a process for operating a steering system according to another embodiment of the present invention, FIGS. 3 and 4 show flow charts of sub-processes in the process of FIGS. 2A and 2B.

DETAILED DESCRIPTION OF PREFERRED EMBODIMENTS

Figure 1:
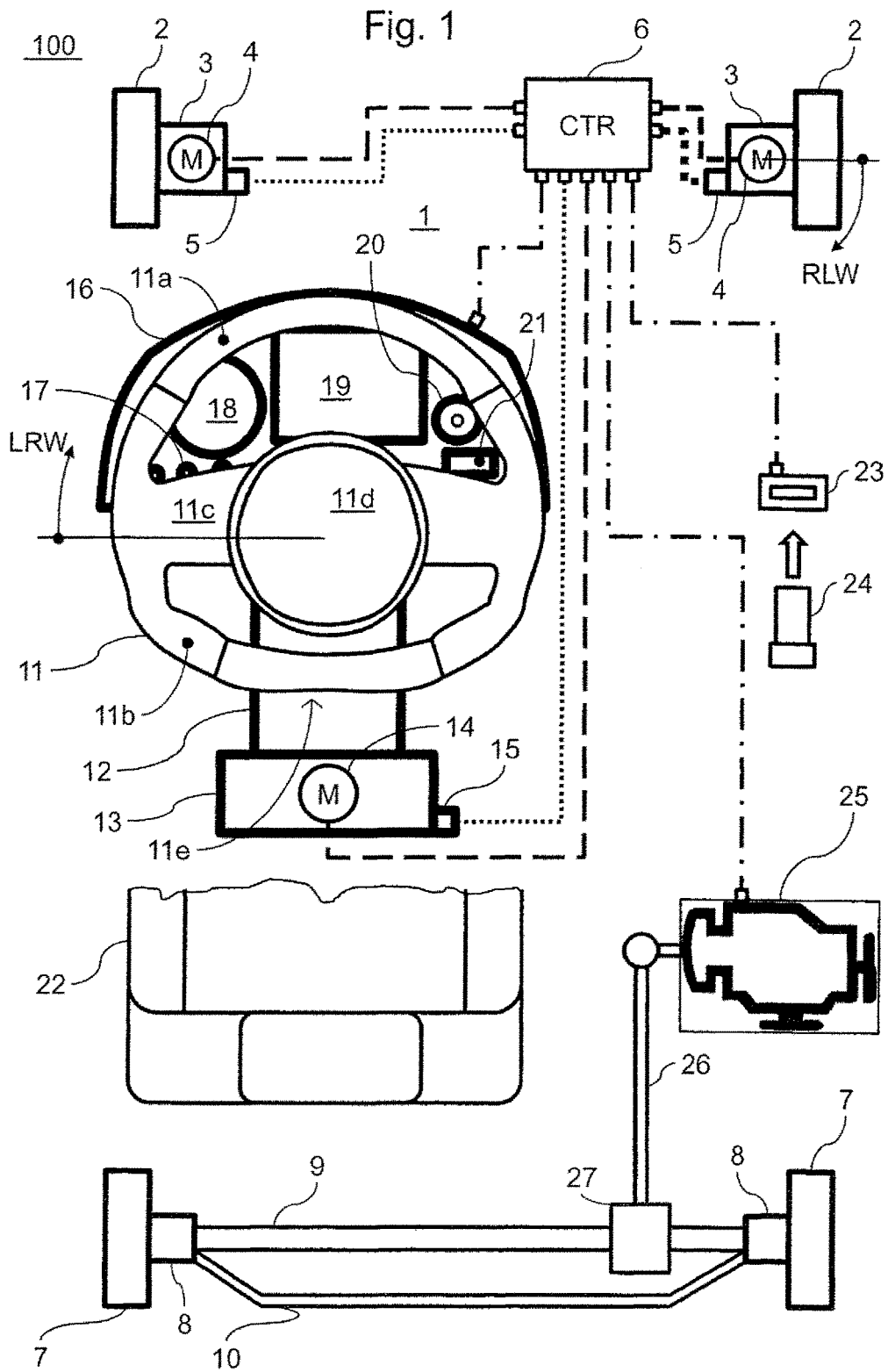
FIG. 1 shows a vehicle with a steering system according to a first embodiment of the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic diagram of a vehicle 100 with a steering system 1 according to an exemplary embodiment of the present invention. It should be noted that both the vehicle 100 and the steering system 1 are separate embodiments of the present invention.

In this exemplary embodiment, the vehicle 100 is a four-wheeled motor vehicle or automobile, and the steering system 1 is a so-called steer-by-wire system. As shown in FIG. 1, the steering system 1 has two steerable wheels 2, which are front wheels in the present exemplary embodiment. The steerable wheels 2 are each connected by a wheel suspension 3 to a supporting structure (not shown in detail) of the vehicle 100. The wheel suspensions 3 each have an electromechanical wheel steering drive 4 and a wheel angle sensor 5. A wheel angle RLW corresponds to a steering angle of the respective wheel 2. A controller (CTR) 6 is connected to the wheel steering drives 4 by a respective control command line (indicated by a dashed line) and is connected to the wheel angle sensors 5 by a sensor signal line (indicated by a dotted line). Two non-steerable wheels 7, which are connected to the supporting structure of the vehicle 100 via a wheel suspension 8, form the rear wheels of the vehicle 100. The wheel suspensions 8 are connected with each other via an axle structure 9 having a stabilizing rod 10.

A steering wheel 11 has an upper gripping portion 11a, a lower gripping portion 11b, a two-piece cross member 11c and a hub 11d. The lower gripping portion 11b has a flattened region 11e. The steering wheel 11 is connected to a steering column 12 which is supported on the supporting structure of the vehicle 100 in a steering column bearing 13. The steering column bearing 13 has a steering wheel actuator 14 and a steering wheel angle sensor 15. The steering wheel actuator 14 is connected to the controller 6 via a control command line (shown by a dashed line) while the steering wheel angle sensor 15 is connected to the controller 6 via a sensor signal line (shown as a dotted line). The controller is designed to receive and process output signals from the wheel angle sensors. 5 and the steering wheel angle sensor 15 and to calculate and send steering command signals for the wheel steering drives 4 and the steering wheel actuator 14.

Thus, the steering system 1 is a so-called steer-by-wire system wherein the steering wheel 11 is mechanically decoupled from the steerable wheels 2.

The vehicle 100 includes an instrument cluster 16 which is disposed behind the steering wheel 11 as viewed from a driver. The instrument cluster 16 is installed in an instrument panel (not shown in detail) of the vehicle 100. The instrument cluster 16 has in this exemplary embodiment a plurality of indicator lamps 17, a round instrument 18, a multifunction display screen 19, a camera 20 and a status indicator 21. In the illustrated situation, the steering wheel 11 is shown in a neutral position, in which the cross member 11c is oriented horizontally, the upper gripping portion 11a is on top, and the lower gripping portion 11b is with the flattened region 11e is at the bottom. With the upper gripping portion 11a on top, a clearance between the upper gripping portion 11a and the cross member 11c provides an unobstructed view of the instruments 17-21 of the instrument cluster 16. In other words, a line of sight between the aforementioned areas of the instrument cluster and the eyes of a driver (not shown in detail) seated on a driver's seat 22 of the vehicle 11 is not obstructed by the steering wheel 11. As evident from FIG. 1, when the steering wheel 11 is rotated clockwise, the indicator lamps 17 are obstructed first, then the round instrument 18 and then at least partially the multifunction display screen 19; conversely, when the steering wheel 11 is rotated counter-clockwise, the status display 21 is obstructed first, then the camera 20 and at least partially the multifunction display screen 19 etc.

The vehicle further includes an ignition lock 23 for receiving an ignition key 24. The ignition key 24 may be an electronic or a mechanical key. The ignition switch 23 is connected to the controller 6 via a signal line. The ignition switch 23 is configured to receive the ignition key 24, to detect ignition positions, and to lock and release the ignition key 24.

The steerable (rear) wheels 7 can be driven by a drive system 25 via a drive train 26 and a differential 27. The drive system 25, which is in the exemplary embodiment constructed as a motor/gear unit with a clutch, is connected to the controller 6 via a signal line.

Also, the instrument panel 16 is also connected to the controller 6 via a signal line.

It will be understood that the controller 6 can be subdivided according to various functions or can be arbitrarily distributed or combined. The controller 6 can thus be understood in particular as a schematic placeholder for several controllers or an arrangement of controllers. The signal lines can each contain command and/or sensor signal lines which are connected to actuators and/or sensors of the respective devices. Command signals in the area of the instrument cluster 16 can also be signals that effect a display by the indicator lamps 17, the round instrument 18, the multifunction display screen 19 or the status display 21, while sensor signals may also be signals representing switch operations, selection on the touch-sensitive multifunction display screen 19 or image signals from the camera 20.

Figure 4:
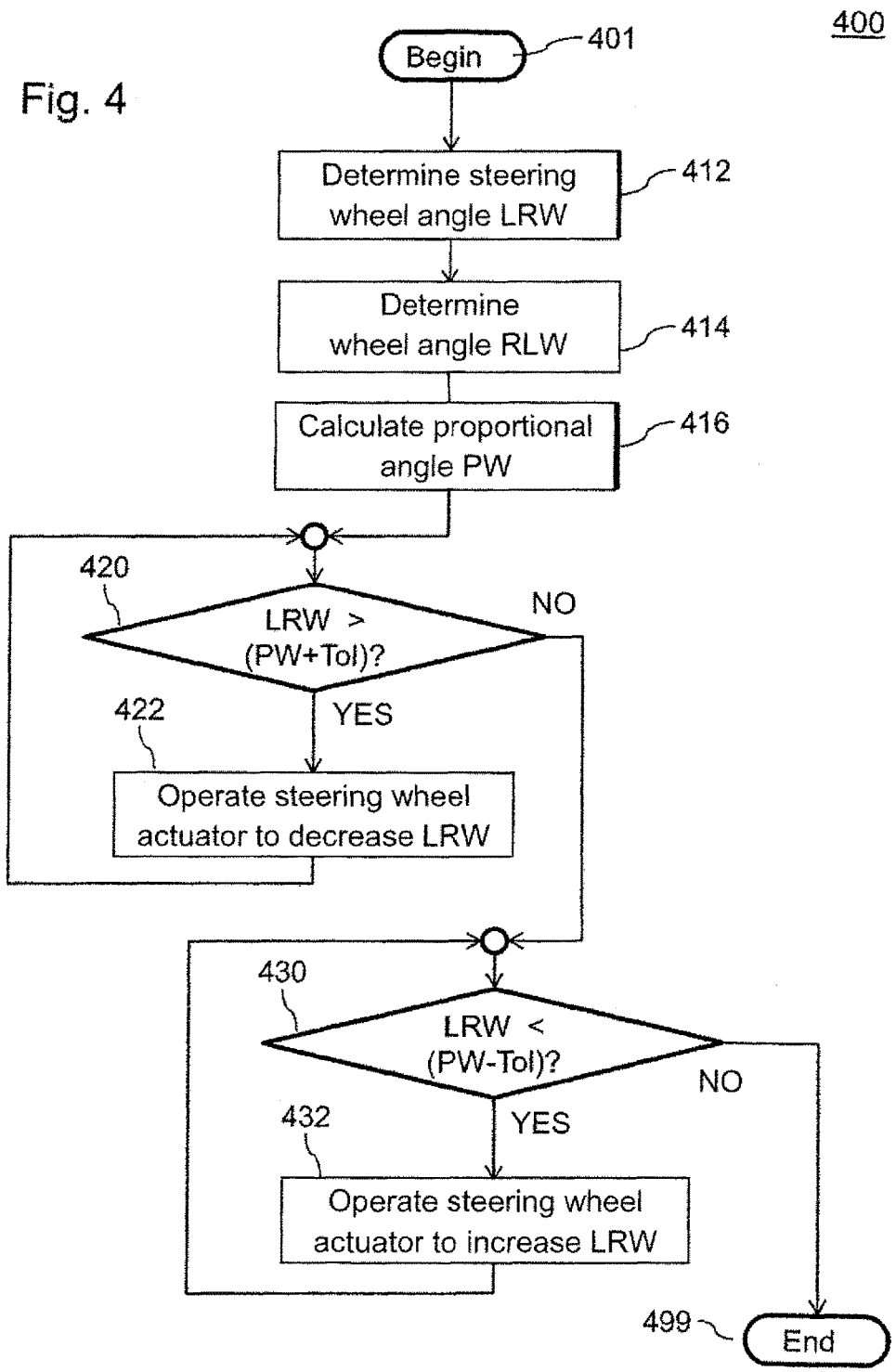

The steering system 1 is operated by a method having a process 200 illustrated in FIGS. 2A, 2B with sub-processes 300, 400 illustrated in FIGS. 3, 4. With respect to components 1 to 27 mentioned in conjunction with FIGS. 2A, 2B, 3 and 4, reference is made to the diagram in FIG. 1.

After the process 200 has been called or started (step 201), it is first checked whether or not the key (ignition key) 24 is inserted into the ignition switch 23 or is in a wireless range. Alternatively, it can also be first checked after the process 200 has been called or started (step 201), whether the door of the vehicle is open or unlocked (step 210). This test at step 210 is performed for as long as the answer is "NO". If the answer at step 210 is "YES", then the steering wheel 11 is moved by the steering wheel actuator 14 into the neutral position (step 212 and sub-process 300, which is shown in detail in FIG. 3 and will be described later). Because the line of sight between the camera 20 and the operator in the driver's seat 22 is unobstructed in the neutral position, the camera can capture the driver. The result of the capture by the camera 20 is supplied to a partial process of a driver identification (step 214). The step 214 for the driver identification is terminated only when a driver registered for the vehicle 100 has been detected. The partial process of the driver identification as well as a process for a registration of drivers are not part of this invention and are therefore not shown in detail. Alternatively, the vehicle can also be personalized, meaning that the ignition would still be released even when the driver remains unidentified. In this case, the systems of the vehicle will then just not be adapted to the driver. The ignition is then released by the ignition switch 23 after successful driver identification (step 216). It is then checked whether the ignition has been switched on or not (step 220). This test at step 220 is performed for as long as the answer is "NO". When the answer at step 220 is "YES", it is also checked whether or not a vehicle operation has been requested by the driver (step 230). Such a request may be made, for example, via the multifunction display screen 19 (touch input), a switch or voice input. This test at step 230 is performed for as long as the answer is "NO". When the answer at step 230 is "YES", the steering wheel 11 is moved by the steering wheel actuator 14 to the proportional position (step 232 and sub-process 400, which is shown in FIG. 4 in more detail and will be described later). The proportional position is a steering wheel position that corresponds to a wheel angle of the steerable wheels 2. Step 230 hence corresponds to a request by the driver for the proportional position, which may be made, for example, via the multifunction display screen 19, a switch or voice input. Thereafter, the driving operation of the vehicle 100 is released (step 234), i.e., the vehicle can be moved by operating the propulsion drive 25. The release of the driving operation may also include a release of brakes.

The further steps of the process 200 are shown in FIG. 2B. After release of the driving operation, it is checked whether or not the vehicle 100 is stopped (step 240). This test at step 240, which is performed, for example, by evaluating sensor signals from the propulsion drive 25 or from a brakes or a wheel rotation transducer, can be carried for as long as the answer is "NO". When the answer at step 240 is "YES", it is also checked whether or not the vehicle ignition had been switched off (step 250). If the answer at step 240 is "YES", the driving operation is initially blocked (step 252), so that the vehicle cannot be moved. Blocking of the driving operation may include, for example, deactivating the propulsion drive 25 and/or applying the brakes. A warning is then issued which informs the driver that the steering wheel 11 will now be placed in the neutral position (step 253), and it is checked whether the driver has confirmed the neutral position (step 254). Only then is the steering wheel 11 placed in the neutral position (step 255 and sub-process 300), the key (ignition key) 23 is released by the ignition switch 24 (step 256), whereafter the operation of the vehicle is terminated (step 258). The process 200 then ends (step 299).

It is generally possible in the method for operating a steering system of a vehicle to carry out the aforedescribed alarm/confirmation step before each adjustment of the steering wheel.

If the answer at step 250 is "NO" (i.e. the ignition is not switched off), it is first checked whether or not a neutral position of the steering wheel 11 has been requested by the driver (step 260). When the answer at step 260 is "YES", the driving operation is blocked as described above for step 252 (step 262), so that the vehicle can no longer be moved. Only then will the steering wheel 11 be moved by the steering wheel actuator 14 into the neutral position (step 264 and sub-process 300). Thereafter, the process returns to step 230 (FIG. 2A) in order to release the driving operation upon a request from the driver (see above description). This process path via the steps 250, 260, 262, 264, allows the driver to exit the vehicle even when the ignition is switched on and the steering wheel 11 to nevertheless be placed in the neutral position.

If the answer at step 260 is "NO" (i.e. when a neutral position was not requested), the process returns to step 240 in order to check whether the vehicle is stopped. In other words, steps 240, 250 and 260 form a loop that will be exited when the answer at step 250 or 260 is "YES". The entire process 200 is terminated only when the answer at step 250 is "YES". It will be understood that after completion of the operation at step 299, a standby mode can be activated, which may coincide with a re-start of the process 200 (step 201).

As described above, a warning is issued prior to step 255, in which the steering wheel is placed in the neutral position 11 by the sub-process 300, and a confirmation from the driver is waited for. This ensures that the driver becomes aware of the forthcoming adjustment of the steering wheel 11. Only the warning may be issued instead of a confirmation. The warning or alarm can be outputted via one of the indicator lamps 17, the multifunction display screen 19, the status indicator 21 or in other ways, for example acoustically. The confirmation can be provided via the multifunction display screen 19 or in other ways, for example via a switch by voice input.

The sub-process 300 performed at steps 212, 255 or 264 to move the steering wheel 11 into the neutral position will be described below with reference to the flowchart in FIG. 3.

After the sub-process 300 has been called or started (step 301), the steering wheel angle LRW is determined first (step 312). Thereafter, the neutral position angle NW, which corresponds to the neutral position of the steering wheel 11, is read from a memory of the controller 6 (step 314). The neutral position angle NW will generally be zero degrees; however, the invention is not limited thereto. The neutral position angle NW can also correspond to a certain angular position of the steering wheel 11 when the view onto the instrument cluster 16 or onto a selected portion thereof is better. It is then checked whether or not the steering wheel angle LRW is greater than the neutral position angle NW plus a tolerance Tol (step 320). If the answer at step 320 is "NO", it is checked whether or not the steering wheel angle LRW is smaller than the neutral position angle NW minus the tolerance Tot (step 330). If the answer at step 330 is "NO", the sub-process 300 ends (step 399), since the steering wheel angle LRW is obviously equal to the neutral position angle NW within the specified tolerance ±Tol.

If the answer at step 320 is "YES", the steering wheel actuator 14 is operated to reduce the steering wheel angle LRW (step 322). This is repeated until the steering wheel angle LRW is at most equal to the neutral position angle NW plus the tolerance Tol. The answer at step 320 is then "NO", and the process proceeds via step 330 ("NO", because the steering wheel angle LRW is now within the tolerance range of ±Tol around the neutral position angle NW) to step 399, whereby the sub-process 300 ends.

If the answer at step 330 is "YES", the steering wheel actuator 14 is operated to increase the steering wheel angle LRW (step 332). This is repeated until the steering wheel angle LRW is at least equal to the neutral position angle NW minus the tolerance Tol. The answer at step 330 is then "NO", and the process proceeds to step 399, whereby the sub-process 300 ends.

The sub-process 400 performed at step 232 to move the steering wheel 11 into the proportional position will be described below with reference to the flowchart in FIG. 4.

After the sub-process 400 has been called or started (step 401), the steering wheel angle LRW is determined first (step 412). Thereafter, the wheel angle RLW which corresponds to a steering angle of the steerable wheels 2 is determined from an output signal of the wheel angle sensor 5 (step 414). The proportional angle PW is then calculated from the wheel angle RLW as the angle of the steering wheel 11 that corresponds to the wheel angle RLW. It is then checked whether or not the steering wheel angle LRW is greater than the proportional angle PW plus a tolerance Tol (step 420). If the answer at step 420 is "NO", it is checked whether or not the steering wheel angle LRW is smaller than the proportional angle PW minus the tolerance Tol (step 430). If the answer at step 430 is "NO", the sub-process 400 ends (step 499), since the steering wheel angle LRW is obviously equal to the proportional angle PW within the specified tolerance ±Tol.

If the answer at step 420 is "YES", the steering wheel actuator 14 is operated to reduce the steering wheel angle LRW (step 422). This is repeated until the steering wheel angle LRW is at most equal to the proportional angle PW plus the tolerance Tol. The answer at step 420 is then "NO", and the process proceeds via step 430 ("NO", because the steering wheel angle LRW is now within the tolerance range of ±Tol around the proportional angle PW) to step 499, whereby the sub-process 400 ends.

If the answer at step 430 is "YES", the steering wheel actuator 14 is operated to increase the steering wheel angle LRW (step 432). This is repeated until the steering wheel angle LRW is at least equal to the proportional angle PW minus the tolerance Tol. The answer at step 430 is then "NO", and the process proceeds to step 499, whereby the sub-process 400 ends.

Although the tolerance Tol is indicated as being identical in all sub-processes 300, 400, it may also be different, and may be different in the positive and negative direction.

The aforedescribed process 200 with sub-processes 300, 400 corresponds to a method for operating the steering system 1 and is controlled by the controller 6.

In the present exemplary embodiment, the steerable wheels 2 can each be steered using a dedicated individually controllable wheel steering drive 4. However, the invention is not limited thereto. Instead, the steerable wheels 2 can have a common wheel steering drive 4 which acts on both wheel suspension 3, for example via a rack and pinion mechanism. The invention is also not limited to steerable front wheels. Instead, the rear wheels of the vehicle 100 may also be steerable wheels (additionally or separately). The invention is also not limited to four-wheeled vehicles with two or four steerable wheels. Instead, the invention is also applicable to vehicles with two, three, five or more wheels, of which an arbitrary number may be steerable.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for operating a steering system of a vehicle, wherein the steering system comprises a steering wheel, a steerable wheel mechanically decoupled from the steering wheel, a steering wheel actuator for setting a rotational position of the steering wheel, a wheel steering drive for steering of the steerable wheel, and a controller for controlling the wheel steering drive and the steering wheel actuator, the method comprising when the ignition is switched off, moving the steering wheel with the steering wheel actuator automatically into a neutral position that is independent of a wheel angle of the steerable wheel and that is a position in which an unobstructed view of at least one predetermined area of a vehicle instrument cluster comprising a camera aimed at the driver of the vehicle for observation of the driver of the vehicle is provided such that the camera can capture the driver in the neutral position, and carrying out the moving of the steering wheel with the steering wheel actuator automatically into the neutral position in response to a feedback from the camera aimed at the driver.

2. The method of claim 1, wherein moving the steering wheel into the neutral position is enabled only when the vehicle is stopped.

3. The method of claim 1, further comprising preventing the vehicle from driving away when the steering wheel is in the neutral position.

4. The method of claim 1, wherein other predetermined areas of the instrument cluster comprise at least one component selected from a multifunction display screen, a status indicator, a mileage indicator, a fuel gauge and an indicator lamp.

5. The method of claim 1, wherein in the neutral position, a flattened portion of the steering wheel comes to rest so as to point downward.

6. A steering system of a vehicle, comprising:
a steering wheel,
a steerable wheel that is mechanically decoupled from the steering wheel,
a steering wheel actuator for setting a rotational position of the steering wheel,
a wheel steering drive for steering the steerable wheel, and
a controller for controlling the wheel steering drive and the steering wheel actuator, said controller being configured to operate the steering system so as to automatically move the steering wheel with the steering wheel actuator into a neutral position that is independent of a wheel angle of the steerable wheel, when the ignition is switched off and that is a position in which an unobstructed view of at least one predetermined area of a vehicle instrument cluster comprising a camera aimed at a driver of the vehicle for observation of the driver of the vehicle is provided such that the camera can capture the driver in the neutral position, and to carry out the moving of the steering wheel with the steering wheel actuator automatically into the neutral position in response to a feedback from the camera aimed at the driver.

7. A vehicle comprising a steering system comprising:
a steering wheel,
a steerable wheel that is mechanically decoupled from the steering wheel,
a steering wheel actuator for setting a rotational position of the steering wheel,
a wheel steering drive for steering the steerable wheel, and
a controller for controlling the wheel steering drive and the steering wheel actuator, wherein the controller is configured to operate the steering system so as to automatically move the steering wheel with the steering wheel actuator into a neutral position that is independent of a wheel angle of the steerable wheel, when the ignition is switched off and that is a position in which an unobstructed view of at least one predetermined area of a vehicle instrument cluster comprising a camera aimed at a driver of a vehicle for observation of the driver of the vehicle is provided such that the camera can capture the driver in the neutral position, and to carry out the moving of the steering wheel with the steering wheel actuator automatically into the neutral position in response to a feedback from the camera aimed at the driver.

* * * * *